United States Patent [19]

Looney

[11] Patent Number: 4,640,304
[45] Date of Patent: Feb. 3, 1987

[54] OVERFLOW VENT VALVE

[75] Inventor: Raymond H. Looney, Tulsa, Okla.

[73] Assignee: Baird Manufacturing Company, Tulsa, Okla.

[21] Appl. No.: 714,982

[22] Filed: Mar. 22, 1985

[51] Int. Cl.$^4$ .............................................. F16K 24/04
[52] U.S. Cl. .................................. 137/202; 137/614.2; 137/614.21
[58] Field of Search .................... 137/202, 433, 614.2, 137/614.21

[56] References Cited

U.S. PATENT DOCUMENTS

| | | | |
|---|---|---|---|
| 2,111,473 | 3/1938 | Hudson | 137/202 |
| 3,401,751 | 9/1968 | Loftin | 137/202 X |
| 4,457,325 | 7/1984 | Green | 137/202 X |

Primary Examiner—Alan Cohan
Attorney, Agent, or Firm—Head, Johnson & Stevenson

[57] ABSTRACT

An overflow vent valve comprising a housing adapted to be installed wherein it is desirable to release excessive gas pressure from a flow system while precluding the discharge of liquid therefrom, a normally closed pressure responsive check valve disposed within the housing, a ported cage secured to the check valve and suspended within the interior of the housing for communication fluid pressure from the housing to the check valve, and a lightweight ball loosely disposed within the interior of the ported cage for floating on the surface of any liquid present within the interior of the cage, the ball adapted to engage a second valve seat provided on the check valve in the event the level of the liquid rises sufficiently within the cage, the engagement of the lightweight valve with the second valve seat precluding the discharge of liquid from the overflow vent valve assembly.

3 Claims, 4 Drawing Figures

OVERFLOW VENT VALVE

BACKGROUND OF THE INVENTION

1. Field of the Invention

This invention relates to improvements in valves and more particularly, but not by way of limitation, to a casing overflow vent valve.

2. Description of the Prior Art

It is frequently desirable to vent air or other gaseous fluids from a flow line system, or the like, in order to prevent air pockets in the line which might restrict fluid flow therethrough. In addition, it may be desirable to vent air or gaseous fluids in other environments, such as the casing of a producing oil and/or gas well bore, or the like. Of course, it is desirable to vent the air or gas at these environments without loss of fluid from the system. One type of valve which has been devised to solve this problem is an overflow vent valve manufactured by Baird Manufacturing Company and which comprises a housing adapted to be installed in the line, or the like whereby the interior of the housing is in communication with the interior of the flow line. An internal ported cage is provided in the housing for direction any gaseous fluid present in the flow line to a relief valve provided in the housing. Any pressure present in the flow line which is in excess of atmospheric pressure, or the ambient pressure surrounding the housing will open the valve for venting of the gaseous fluid therethrough. This valve has certain disadvantages in that the valve closure member may be "sucked up" in a manner which might shut the valve during a high-velocity gas flow.

SUMMARY OF THE INVENTION

The present invention contemplates a novel overflow vent valve which has been particularly designed and constructed for overcoming the foregoing disadvantages. The novel valve comprises an outer housing adapted to be installed in a flow line, or the like, in open communication with the interior thereof. A check valve means is disposed within the housing and a parted cage means is secured to the valve means for communicating any pressure within the housing to the valve. A ported cap means is secured to the housing above the valve means for exhausting any gas released through the valve to the atmosphere. A ball means is loosely disposed the cage means and is constructed from a lightweight material, such as a hollow plastic ball, whereby any liquid which may enter the housing and/or cage means will cause the hollow ball to rise within the cage as the liquid level rises therein. Sealing means is provided on the valve means for engagement by the hollow ball in the uppermost position thereof whereby the valve will be efficiently closed in the event the fluid rises therein to a excessive degree, thus precluding any accidental discharge of the fluid from the valve. The novel overflow vent valve is simple and efficient in operation and economical in operation.

BRIEF DESCRIPTION OF THE DRAWINGS

FIG. 3 is a side elevational view illustrating an overflow vent valve embodying the invention as installed in connection with a saltwater flow line, or the like.

DETAILED DESCRIPTION OF THE PREFERRED EMBODIMENT

Figure 1:
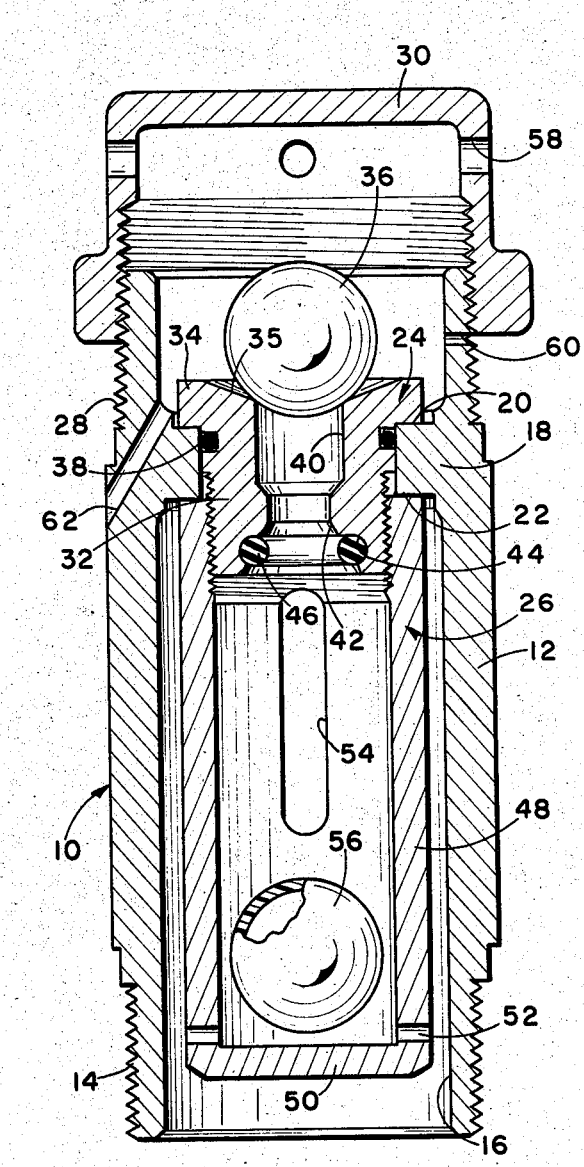
FIG. 1 is a sectional elevational view of an overflow vent valve embodying the invention.
Figure 2:
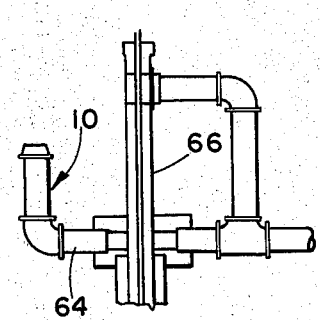
FIG. 2 is a side elevational view illustrating an overflow vent valve embodying the invention as installed in connection with a producing oil and/or gas well.
Figure 3:
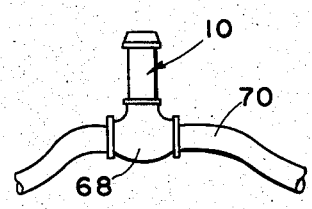
Figure 4:
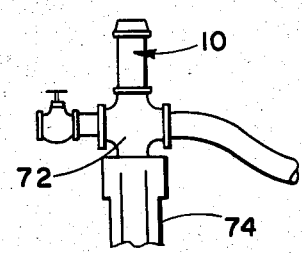
FIG. 4 is a side elevational view illustrating an overflow vent valve embodying the invention as installed in connection with a disposal or injection well in the oil and/or gas well producing industry.

Referring to the drawings in detail, reference character 10 generally indicates an overflow vent valve comprising an outer sleeve or housing means 12 having one end 14 thereof threaded for connection with a flow line, or the like (not shown in FIG. 1) as is well know. A central bore 16 is provided in the housing 12 and is open to the interior of the flow line for receiving fluid pressure therefrom. An inwardly directed annular flange 18 is provided on the inner periphery of the bore 16 providing first and second annular shoulders 20 and 22. A valve assembly generally indicated at 24 is supported by the shoulder 20 and extends longitudinal beyond the flange 18 for threaded connection with a cage means 26 which is concentrically disposed within the bore 16. The upper end of the cage 26 as shown in FIG. 1 is in engagement with the shoulder 22, thus securely retaining the valve assembly 24 in position within the housing 12. The opposite end 28 the housing with respect to the end 14 is threaded for removably receiving a cap member 30 thereon which encases the outer end of the valve assembly 24.

The valve assembly 24 comprises an externally threaded body 32 having an outwardly extending circumferentail flange 32 at the upper end thereof as viewed in FIG. 1 for engagement with the shoulder 20. The outer surface of the flange 34 is preferably beveled or radially inwardly tapered to provide a seat 35 for a ball member 36 which is normally retained thereagainst by gravity to provide a normally closed position for the valve 24. Of course, suitable sealing means 38 may be interposed between the outer periphery of the body 32 and the inner periphery of the flange 18 for precluding leakage of fluid therebetween. A central bore 40 extends through the body 32 from the tapered valve seat 35 to the opposite end thereof. The bore 40 terminates at the lower end thereof in a substantially conical or radially outwardly flared portion 42 having an annular groove 44 provided therein for receiving a suitable sealing means, such as an O-ring 46 providing a second or auxilliary seat for the valve 24. The bore 40 is open to the interior of the cage means 26 for receiving fluid pressure therefrom.

The cage means 26 comprises a sleeve member 48 having the upper end thereof in threaded connection with the valve body 32 and the lower end thereof closed by a wall 50. A plurality of circumferentially spaced bores 52 are provided in the sleeve 48 in the proximity of the wall 50 to provide communication between the interior of the sleeve 48 and the interior of the housing 12. In addition, at least one, and preferably a plurality of elongated slots 54 are provided in the sleeve 48 in the proximity of the valve assembly 24 for a purpose as will be hereinafter set forth. A lightweight ball 56 is loosely disposed within the interior of the sleeve 48 and normally remains at the lower end thereof or against the wall 50. The ball 56 is preferably constructed of a lightweight plastic material, and is preferably hollow whereby the ball will float at the surface of substantially any fluid which might enter the interior of the sleeve 48.

The cap member 30 is preferably provided with a plurality of circumferentially spaced ports 58 spaced above the valve assemby 24 for venting gas from the interior of the cap 30 to the atmosphere, or the like. In addition suitable drain ports 60 and 62 may be provided in the sleeve 12 substantially immediately above the flange 18 whereby any condensation or liquid which might be present above the valve assembly 24 may be drained from the housing 12.

In use, the overflow vent valve 10 may be installed at substantially any site wherein it undesirable to vent gaseous fluid from a pressure fluid environment while precluding the loss of liquid therefrom. As for example, the valve 10 may be installed at the outer end of a pipe means 64 which is secured to a suitable casing 66 of a producing oil and/or gas well. The interior of the pipe means 64 is in communication with the interior of the casing 66 and interior of the housing 16 for transmitting fluid pressure from the well casing to the valve assembly 10. Alternatively, the valve assembly 10 may be secured to a suitable Tee fitting means 68 interposed in a saltwater line, or other flow line 70. The interior of the Tee fitting means 68 is in communication with the interior of the flow line 70 and the interior of the valve 10 for transmitting the fluid pressure present in the line 70 to the valve 10. A still further possible environment for the valve 10 may be at the usual Tee fitting means 72 usually provided at the upper end of the casing means 74 of a disposal or injection well bore (not shown) in the oil and/or gas industry. The Tee fitting 72 is in communication with the interior of the casing means 74 and interior of the valve 10 for passing fluid pressure from the casing 74 into the interior of the valve 10.

As long as the gaseous element entering the bore 16 is less than the ambient pressure surrounding the housing 12 and cap 58, the ball 36 remains in engagement with the valve seat 35 by gravity, thus precluding the release of any fluid from the interior of the valve assembly 10. In the event the pressure within the bore 16 becomes excessive, the pressure will be transmitted to the closure member 36 through the ported cage means 26 for engaging ball 36 and lifting the ball from the valve seat 35 whereupon the excessive gas pressure will be fented through the ports 58 of the cap 30. In the event any condensation or other moisture accumulates within the cap 30 and/or the housing 12 about the valve seat 35, the fluid may drain through the ports 60 and 62. In the event the liquid components of the flow stream, or the like, rise to an abnormally high level and enter the bore 16, the liquid will initially enter the interior of the cage or sleeve 48 through the lower ports 52 in the proximity of the lightweight ball 56. As the level of the fluid within the interior of the sleeve 48 rises, the ball 56 will rise simultaneously therewith until the ball 56 engages the second valve seat 46 for closing off communication between the interior of the sleeve 48 and the bore 40. Of course, the higher the fluid rises, the tighter the ball 56 will be urged against the seat 46, thus assuring an efficient seal for precluding the flow of the liquid from the valve assembly 10.

From the foregoing it will be apparent that the present invention provides a novel overflow vent valve comprising a housing adapted to be installed substantially any site or in any environment wherein it is desirable to release excessive gaseous elements while precluding the escape of liquid components. The novel valve includes a gravity responsive normally closed check valve means disposed within the housing and responsive to the presence of excessive pressure within the housing for opening to relieve the gas pressure from the housing. A ported cage means is secured to the check valve and supported within the housing for encasing a lightweight loose ball therein. Any liquid which entered the housing is directed into the ported cage whereupon the lightweight ball floats on the surface of the liquid for ultimate engagement with a second valve seat for closing the check valve against any discharge of the liquid components therethrough.

Whereas the present invention has been described in particular relation to the drawings attached hereto, it should be understood that other and further modifications, apart from those shown or suggested herein may be made within the spirit and scope of this invention.

What is claimed is:

1. An overlfow vent valve comprising outer housing means, pressure responsive normally closed check valve means disposed within the outer housing means and responsive to excessive pressure in the housing means for exhausting the pressure therefrom, ported cage means secured to the check valve means and suspended within the interior of the outer housing means, the interior of the ported cage means being in communication with the interior of the outer housing means for receiving fluid pressure therefrom and in communication with the check valve means, said ported cage means including (a) a sleeve member having one end open for communication with the check valve means and the opposite end thereof closed, (b) first port means provided in the proximity of the closed end whereby any liquid present in the interior of the outer housing initially enters the interior of the ported cage means and (c) slot means provided in said sleeve member in the proximity of the open end, said slot means being of larger area than the area of said first port means, secondary valve seat means provided on the check valve means and opens to the interior of the ported cage means, valve closure means loosely disposed within the ported cage means and is not in the proximity of said slot means when said valve closure means is adjacent the closed end of said sleeve member for engaging the secondary valve seat means when the liquid level rises sufficiently within the ported cage means whereby gaseous components of a flow stream may be exhausted through the check valve means and liquid components of the flow stream are precluded from discharge through the check valve means.

2. An overflow vent valve as set forth in claim 1 wherein the valve closure means in the ported change means is a lightweight ball adapted to float on the surface of any liquid contained within the interior of the ported cage means.

3. An overflow vent valve as set forth in claim 1 wherein the outer housing means includes ported cap means encasing a portion of the check valve means for exhaust of any gaseous components released through the check valve means.

* * * * *